(12) United States Patent
Zanichelli

(10) Patent No.: US 11,467,074 B2
(45) Date of Patent: Oct. 11, 2022

(54) SENSOR ARRANGEMENT FOR MEASURING A MECHANICAL LOADING

(71) Applicant: Dana Motion Systems Italia S.R.L., Reggio Emilia (IT)

(72) Inventor: Enzo Zanichelli, Bagnolo in Piano (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 85 days.

(21) Appl. No.: 17/029,766

(22) Filed: Sep. 23, 2020

(65) Prior Publication Data

US 2021/0096049 A1 Apr. 1, 2021

(30) Foreign Application Priority Data

Sep. 26, 2019 (EP) .................................. 19199857

(51) Int. Cl.
*G01N 3/06* (2006.01)
*G01L 1/12* (2006.01)

(52) U.S. Cl.
CPC .............. *G01N 3/066* (2013.01); *G01L 1/127* (2013.01); *G01N 2203/0635* (2013.01)

(58) Field of Classification Search
CPC ......... G01L 1/12; G01L 1/127; G01D 18/008; G01D 11/30; G01R 15/205; H05K 3/366; G01N 3/066; G01N 2203/0635
USPC ......................................................... 73/805
See application file for complete search history.

(56) References Cited

U.S. PATENT DOCUMENTS

| 6,575,041 | B2 * | 6/2003 | Schwarz ................. G01L 1/142 73/780 |
| 2014/0305213 | A1 | 10/2014 | Swanson et al. |
| 2016/0161284 | A1 | 6/2016 | Wu et al. |
| 2018/0156678 | A1 | 6/2018 | Eilersen |

FOREIGN PATENT DOCUMENTS

| CN | 108759918 A | | 11/2018 |
| JP | H0792199 A | * | 4/1995 |

OTHER PUBLICATIONS

European Patent Office, Extended European Search Report Issued in Application No. 19199857.4, dated Apr. 7, 2020, Germany, 8 pages.

* cited by examiner

*Primary Examiner* — Octavia Davis Hollington
(74) *Attorney, Agent, or Firm* — McCoy Russell LLP

(57) ABSTRACT

A sensor arrangement for measuring a mechanical loading, comprising a first member to be mechanically loaded; a first sensor component arranged on the first member; a printed circuit board (PCB); a second sensor component arranged on the PCB and spaced from the first sensor component, wherein an output signal of the second sensor component is indicative of the distance between the first and second sensor components; and an electronic component arranged on the PCB and configured to receive the output signal of the second sensor component, wherein the sensor arrangement is configured such that the distance between the first and second sensor components depends on the mechanical loading applied to the first member.

19 Claims, 3 Drawing Sheets

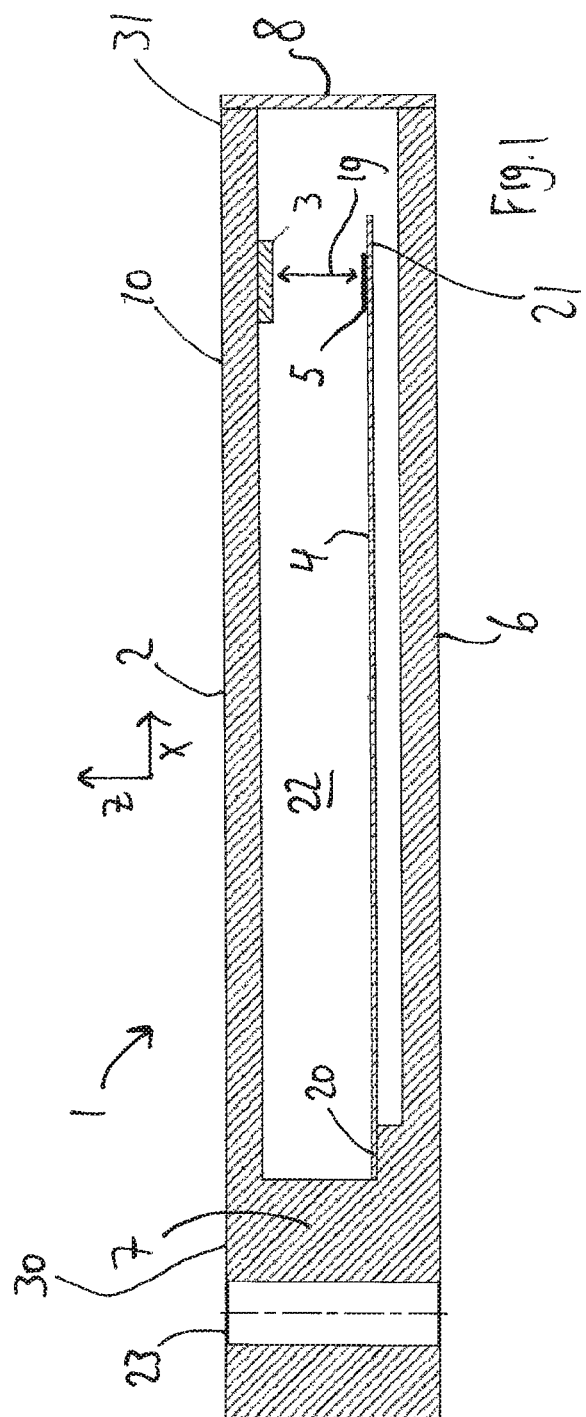
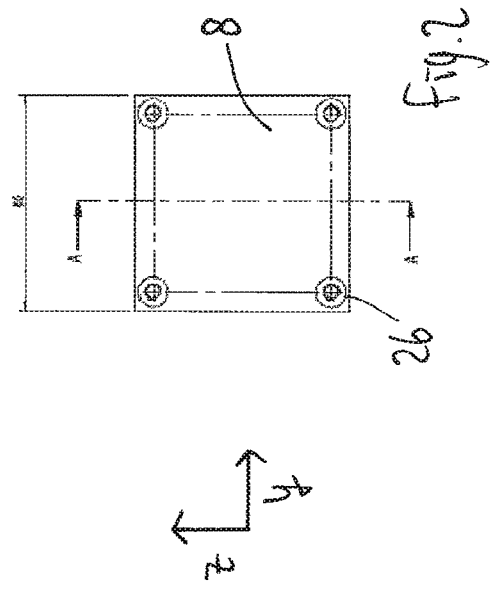

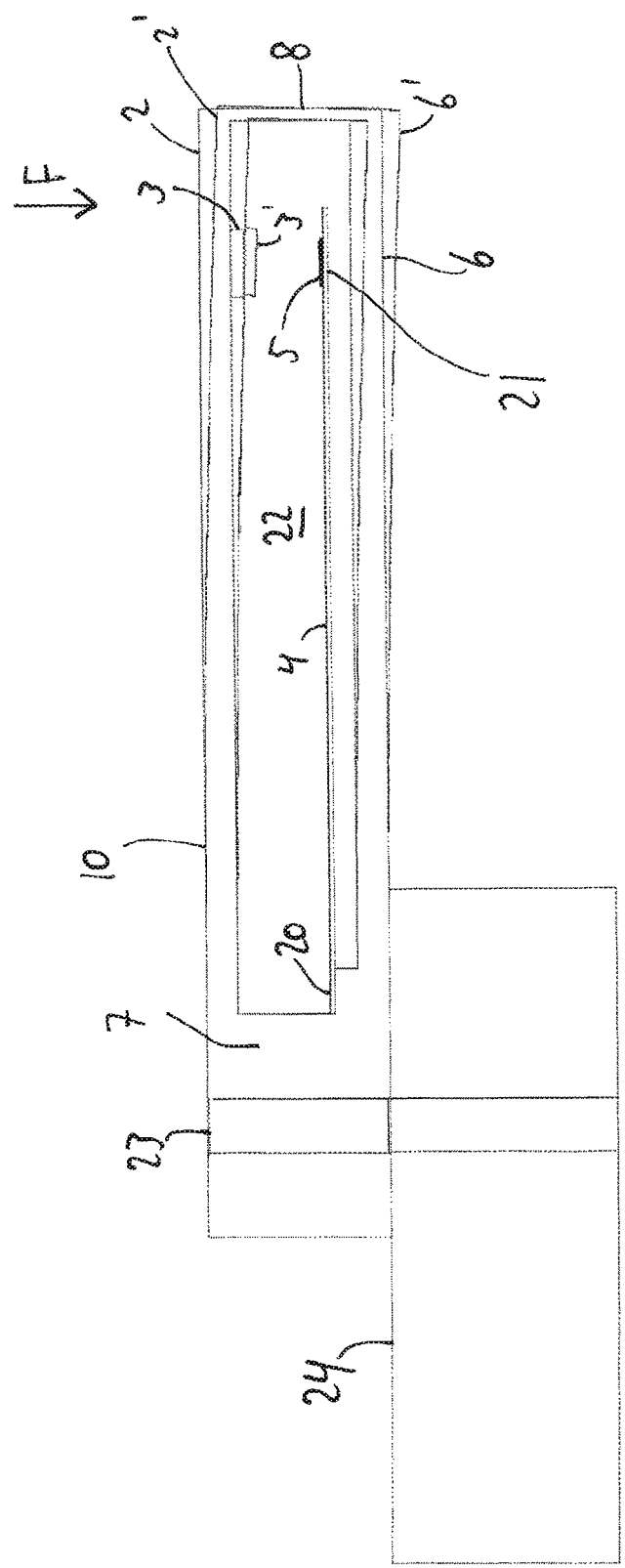

SENSOR ARRANGEMENT FOR MEASURING A MECHANICAL LOADING

CROSS-REFERENCE TO RELATED APPLICATION

The present application claims priority to European Patent Application No. 19199857.4, entitled "SENSOR ARRANGEMENT FOR MEASURING A MECHANICAL LOADING", and filed on Sep. 26, 2019. The entire contents of the above-listed application are hereby incorporated by reference for all purposes.

TECHNICAL FIELD

The present disclosure relates to a sensor arrangement for measuring a mechanical loading.

BACKGROUND AND SUMMARY

Mechanical loadings can be determined e.g. using different techniques. For example, if an electrically conducting material is subjected to a tensile stress, the material length will increase and thus will increase the electrical resistance of the material. Similarly, if the material is subjected to compressive stress, the length will decrease, but the breadth will increase. This principle is used in strain gauges to measure mechanical loadings such as stress, strain or weight that are applied to a structure such as a work piece or a machine.

The most common type of strain gauge comprises an insulating flexible support which supports a metallic foil pattern. The strain gauge can be attached to the structure to be measured by a suitable adhesive. As the structure is deformed, the foil is deformed, causing its electrical resistance to change. For example, the deformation of the foil comprises stretching or bending.

Typical strain gauge foils require at least 15 minutes for the proper installation thereof which is often performed manually. Thus, a drawback of these strain gauges is the relatively long time required for the installation. It would be advantageous to reduce the installation time and associated costs.

Even though many strain gauges can measure the foil deformation with high precision, this high level of precision is not required for all practical applications. In some applications there is a demand for cheaper solutions having a lower grade of precision.

The present disclosure has been made in the light of the foregoing problems.

According to the present disclosure, a sensor arrangement for measuring a mechanical loading is proposed. The sensor arrangement comprises:

a first member to be mechanically loaded;
a first sensor component arranged on the first member;
a printed circuit board (PCB);
a second sensor component arranged on the PCB and spaced from the first sensor component, wherein an output signal of the second sensor component is indicative of the distance between the first and second sensor components; and
an electronic component arranged on the PCB and configured to receive the output signal of the second sensor component.

The sensor arrangement is configured such that the distance between the first and second sensor components depends on the mechanical loading applied to the first member.

The PCB mechanically supports and electrically connects the electrical component and the second sensor component. Thus, by providing the PCB, the installation and production of the sensor arrangement can be considerably simplified as compared to resistive foil strain gauges mentioned above.

The mechanical loading applied to the first member may cause a deformation of the first member, such as a bending or stretching. Dependent on the application, the mechanical loading may be a tensile loading and/or a compressive loading. Due to the deformation of the first member, the first sensor component may be moved towards or away from the second component. Thus, the distance between the first and second sensor components is a measure for the mechanical loading applied to the first member. In some instances, the distance between the first sensor component and the second component increases upon applying the mechanical loading to the first member. In other examples, the distance between the first sensor component and the second component decreases upon applying the mechanical loading to the first member. There may be an air gap between the first and second sensor components. Usually, the first and second sensor components do not contact each other.

The distance between the first and second sensor components can be calculated or estimated using the output signal of the second component. Alternatively or additionally, the distance between the first and second components can be determined by comparing the output signal of the second sensor component to reference values corresponding to specific distances, which could be pre-stored in a look-up table. It is also possible that for the determination of the distance between the first and second sensor components a combination of calculation and comparison with reference values can be used. By determining the displacement of the first sensor component relative to the second sensor component, the mechanical loading applied to the first member can be determined.

In alternative embodiments, the output signal of the second sensor is used to directly determine the mechanical loading that is applied to the first member, e.g. by calculation using the output signal or comparison of the output signal with reference values corresponding to specific mechanical loadings as indicated above.

In some instances, the first sensor component includes a magnetic material. For instance, a portion of the first member may comprise a magnetized area. Further, the first sensor component may be a magnet that is fixed to the first member. The second sensor component can be configured to sense a magnetic field strength of the first sensor component. Thus, the first sensor component may be a passive sensor component while the second sensor component may be an active sensor component. For instance, the output signal of the second sensor component can be proportional to the magnetic field measured by the second sensor component. That is, a small distance between the first and second sensor components can be characterized by a relatively high magnetic field measured by the second sensor component. A large distance between the first and second sensor components can be characterized by a relatively low magnetic field measured by the second sensor component.

The second sensor component may comprise an inductive sensor, a hall sensor or a magnetoresistive sensor. Other sensors that are configured to measure a magnetic field or derivatives thereof can also be contemplated. The costs of such sensor components can be much lower than that associated with strain gauges having foils and based on thin film technology.

The PCB may be positioned relatively to the first member such that a position of the second sensor component remains constant independently of the mechanical loading applied to the first member. The sensor arrangement may include a predetermined portion for receiving the mechanical loading. This predetermined portion for receiving the mechanical loading may be part of the first member, but this is not required.

In some embodiments, the sensor arrangement comprises a first wall and an opposing second wall. The first member may comprise a first end portion and a second end portion. The first and second end portions of the first member may be attached to the first wall and the second wall, respectively. A first end portion of the PCB can be attached to the first wall in a cantilever fashion, and the second sensor component is arranged on a second end portion of the PCB. The predetermined portion for receiving the mechanical loading may be the second end portion of the first member.

The first member and the PCB can extend substantially parallel to each other in a nonloaded condition of the first member. In a loaded condition of the first member, there may be a varying distance between the first member and the PCB, and thus, the PCB and the first member may not extend parallel to each other anymore.

The sensor arrangement may further comprise a second member. The second member may have substantially the same shape as the first member. The PCB can be arranged in a space between the first member and the second member. The first member and the second member can extend parallel to each other in a loaded condition and/or a non-loaded condition of the first member.

In a further development, the sensor arrangement comprises a casing encompassing the PCB. The first member, the second member, the first wall and/or the second wall may be part of the casing. At least two of the aforementioned parts may be integrally formed by the casing. A first end portion of the PCB may be mounted on the inside of the casing in a cantilever fashion. It may be envisaged that the second sensor component is arranged on a second end portion of the PCB. The second end portion of the PCB may be spaced from the second wall. The PCB may protrude into a cavity defined by the casing.

The first member and/or the second member may include, for instance, a beam or a plate. The material and dimensions of the casing, the first member, the second member, the first wall and/or the second wall can be selected such to withstand the mechanical loading and provide measurable displacements of the first sensor component relative to the second sensor component. In common applications, the aforementioned elements can be made of a metal like steel, aluminum or the like. The sensor arrangement can be designed to withstand mechanical loadings of at least 100 kg and/or 10 000 kg at the most.

In some instances, the sensor arrangement is configured such that a position of the second sensor component remains constant independently of the mechanical loading applied to the first member. This may be accomplished, for instance, by a PCB having a rigid substrate and/or by the design of the casing and/or by attaching the PCB at a site that is substantially not deformed upon mechanically loading the first member. In some examples, PCB attachment site may be located opposite to the predetermined portion for receiving the mechanical loading. For instance, the PCB is typically attached to a portion of the casing that has less than 10% or less than 5% of the maximal deformation in the casing when applying the mechanical loading.

In some instances, the PCB comprises a substrate made of a flexible material. In some examples, the PCB may include a slot defining a tongue, and a frame encompassing the tongue. The frame may be attached to the first wall and the second wall. Further, the second sensor component may be arranged on the tongue such that a position of the second sensor component depends on the mechanical loading applied to the first member. Thus, in this case, the mechanical loading applied to the first member may result in a deformation of the tongue. The slot and/or the tongue may be substantially U-shaped or C-shaped.

The PCB may comprise dedicated sensor circuitry for reading, processing, and storing the output signal of the second sensor component. The electronic component can comprise at least one of an analogue-to-digital converter (ADC), a processing unit, a storage device and/or a communication unit.

The sensor arrangement may further comprise fixing means for fixing the sensor arrangement, in particular the casing thereof, to a structure in a cantilever fashion. The sensor arrangement can be used in devices or machines that are configured to carry variable loads.

The present disclosure also provides a device or a machine for carrying variable loads such as a vehicle, a boom lift or a telehandler including the sensor arrangement in accordance with the above. By introducing the sensor arrangement in such devices, machines or systems, the risk of overloads can be greatly reduced. Furthermore, the stability of said devices or machines can be increased. For instance, the sensor arrangement can be part of a load management information system. The load management information system may provide an operator with an indication of how heavy the load is on the machine and/or where the load is in space. For instance, the sensor arrangement can be mounted on an axle of the machine, preferably a load carrying axle, wherein the sensor arrangement measures deflections of the axle as load variations occur. These variations in load may provide the load management system with an indication of the stability of the machine. When load stability is near its limits, the sensor arrangement can be configured to send signals to a control system, which will sound a cabin alarm and prevent functions that further reduce stability from operating.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Further features, properties and advantages of the present disclosure will become clear from the following description of embodiments in conjunction with the accompanying drawings. The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 1 schematically shows a longitudinal cross section of a sensor arrangement.

FIG. 2 schematically shows the sensor arrangement in side view.

FIG. 3 schematically shows a longitudinal cross section of the sensor arrangement of FIG. 1 connected to a structure.

In the following, for ease of description similar or equal features are indicated by the same reference numerals. FIGS. 1-3 are shown with components in proportional size with one another, according to some embodiments.

DETAILED DESCRIPTION

Figure 4:
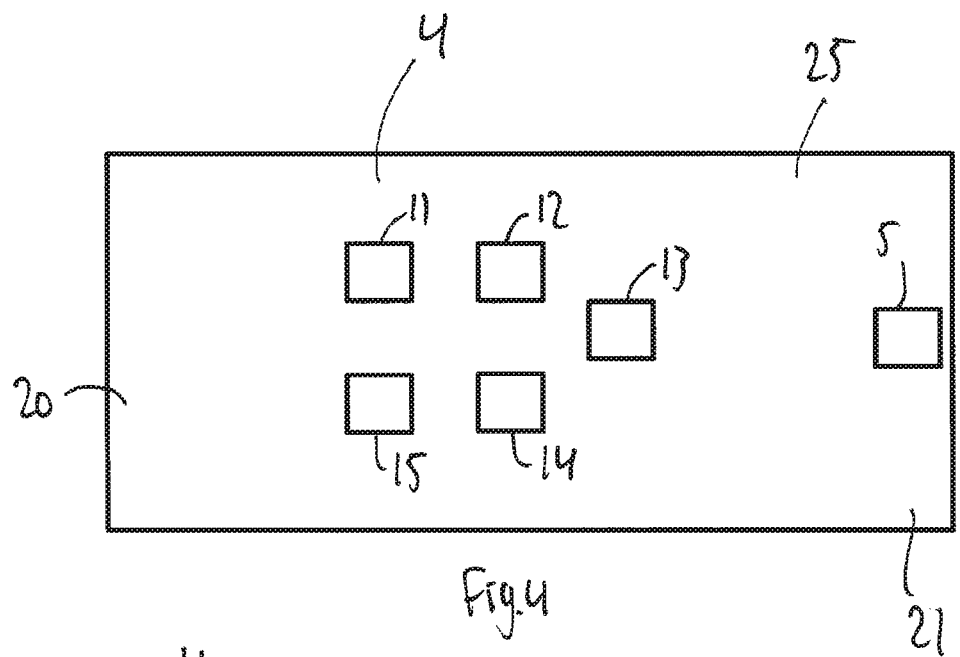
FIG. 4 schematically shows a top view of a PCB.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Throughout this specification relative language such as the words 'near', 'nearby', 'proximate', 'about', and 'approximately' may be used. Unless otherwise specified or described, this language seeks to incorporate at least 10% variability to the specified number or range. That variability may be plus 10% or negative 10% of the particular number specified.

FIG. 1 shows a longitudinal cross section of a sensor arrangement 1. The cross section shown in FIG. 1 is taken along the section A-A of FIG. 2, which shows a side view of the sensor arrangement 1.

The sensor arrangement 1 comprises a casing 10 that includes a first member 2 and an opposing second member 6, a first side wall 7 and an opposing second side wall 8. In the embodiment shown, the first member 2 may be a beam extending in a horizontal direction (x direction). The second member 6 extends parallel to the first member 2 at least in a non-loaded condition of the sensor arrangement 1 and may also be designed as a beam. The first and second members 2, 6 may also be formed as plates or have other geometric forms depending on the practical application. The first member 2 comprises a first end portion 30 and a second end portion 31. The first and second end portions 30, 31 of the first member 2 may be attached to the first side wall 7 and the second wall 8, respectively. The side walls 7, 8 extend vertically (z direction) from the first and second members 2, 6 and connect both members 2, 6 to one other. The casing 10 can be closed by two further side walls (not shown) which run parallel to each other. In the depicted embodiment, the first member 2, the second member 6 and the side wall 7 are integrally formed, i.e. are formed from one part. The side wall 8 is a separate part which can be fixed to the first and second members 2, 6 using fasteners 26 such as screws.

The casing 10 can be made of a metallic material such as steel being configured to withstand high mechanical loadings, e.g. from 100 kg up to 10 000 kg.

The casing 10 can comprise fixing means 23 for fixing the sensor arrangement 1 to a structure 24 in a cantilever fashion (see also FIG. 3).

The casing 10 defines a cavity 20 for enclosing a printed circuit board (PCB) 4. The PCB 4 may have a rectangular shaped perimeter and includes a first end portion 20 and an opposing second end portion 21. The first end portion 20 of the PCB 4 may be mounted to the inside of the casing 10 in a cantilever fashion. As such, the PCB 4 protrudes into the cavity 20 of the casing 10. For example, the first end portion 20 can be attached on a step 27 that can be integrally formed with the first wall 7 and/or the second member 6. The second end portion 21 may be spaced apart from the second wall 8, the first member 2 and the second member 6.

The sensor arrangement 1 comprises a first sensor component 3 and a second sensor component 5 for measuring a mechanical loading applied to the first member 2. More specifically, the first sensor component 3 is arranged on the first member 2, in particular at the second end portion 31 thereof. In the embodiment shown, the first sensor component 3 is attached on a side of the first member 2 facing the cavity 20 of the casing 10. The second sensor component 5 is arranged on the second end portion 21 of the PCB. The second sensor component 5 may be located on the PCB 4 such that it faces the first sensor component 2. In a non-loaded condition of the sensor arrangement 1, there is a predetermined distance 19 between the first sensor component 3 and the second sensor component 5. Thus, the first and second sensor components 3, 5 are spaced from one other by an air gap. The sensor arrangement 1 is configured such that the distance 19 between the first and second sensor components 3, 5 depends on a mechanical loading applied to the first member 2. When a mechanical loading is applied to the first member 2, the distance 19 decreases. In other implementations, the distance 19 may increase upon mechanically loading the first member 2.

The first sensor component 3 may comprise a magnetized material such as a magnet that is attached to the first member 2. The second sensor component 5 is configured to sense a magnetic field strength of the magnetic material of the first sensor component 3. For instance, the second sensor component 5 may be an inductive sensor, a hall sensor or a magnetoresistive sensor.

An output signal of the second sensor component 5 is indicative of the distance between the first and second sensor components 3, 5. For instance, the output signal of the second sensor component 5 can be proportional to the magnetic field measured by the second sensor component 5. That is, a small distance between the first and second sensor components 3, 5 can be characterized by a relatively high magnetic field measured by the second sensor component 5. A large distance between the first and second sensor components 3, 5 can be characterized by a relatively low magnetic field measured by the second sensor component 5.

The PCB 4 is positioned relatively to the first member 2 such that a position of the second sensor component 5 remains constant independently of the mechanical loading applied to the first member 2.

FIG. 3 schematically shows a longitudinal cross section of the sensor arrangement 1 of FIG. 1 connected to the structure 24. Moreover, FIG. 3 shows a non-loaded condition of the sensor arrangement 1 and a loaded condition of the sensor arrangement 1. The first member 2 and the PCB 4 extend substantially parallel to each other in the non-loaded condition of the first member 2. In the loaded condition, elements are indicated with the same reference numeral having an apostrophe (e.g. 2', 3', 6'). As illustrated in FIG. 3, a mechanical loading F is applied to a predetermined loading receiving portion being a second end portion 31 of the first member 2' nearby the second side wall 8. A bending moment is exerted on the first and second members 2', 6' resulting in a displacement of the first sensor component 3'. The PCB 4 being attached to the first wall 7, however, substantially maintains its position, and thus the second sensor component 5 is not moved by the mechanical loading F. In the loaded condition of the first member 2', the distance between the first member 2' and the PCB 4 varies along the horizontal direction (x direction), and thus, the PCB 4 and the first member 2' do not extend parallel to each other anymore. As a result, the distance 19 between the first and second sensor components 3, 5 decreases, which can be measured by a higher magnetic field in the vicinity of the second sensor component 5. As can be seen from FIG. 3, the first and second members 2' and 6' run parallel to each other both in the loaded and the non-loaded conditions.

The values of the magnetic field contained in the output signal of the second sensor component 5 can be directly used to calculate the magnitude of the mechanical loading F at the second end portion 31 of the first member 2. Alternatively, the measured magnetic field can be compared to reference values stored in a look-up table to determine the mechanical loading F. The look-up table may be stored in a storage unit 13 described below. Typically, the sensor arrangement 1 is designed such that a mechanical loading between 100 kg and 10 000 kg can be measured.

Figure 5:
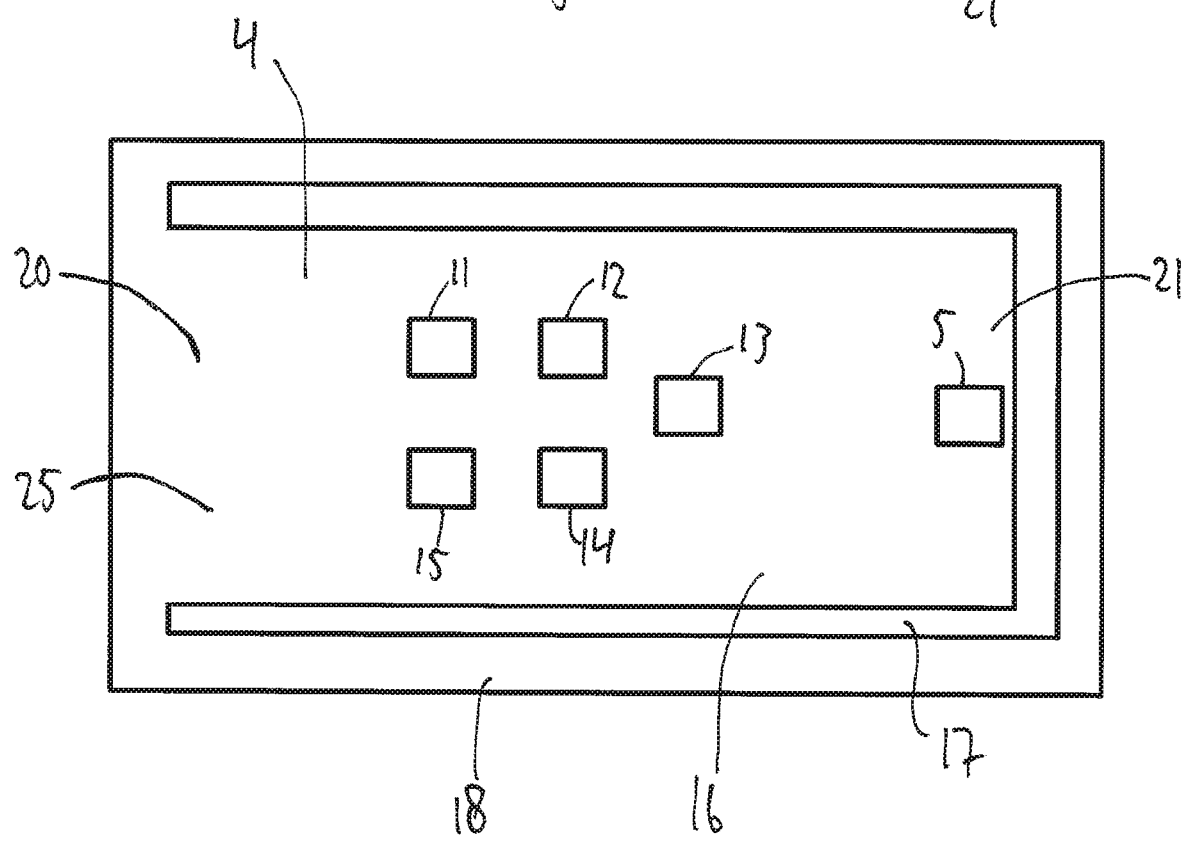
FIG. 5 schematically shows a top view of a further PCB.

FIGS. 4 and 5 illustrate top views of two different PCB's 4. As shown, the PCB 4 serves as mechanical support for several electronic components 11, 12, 13, 14. At least one electronic component 11, 12, 13, 14 or all electronic components 11, 12, 13, 14 are configured to receive the output signal of the second sensor component 5.

The PCB 4 may comprise dedicated sensor circuitry for reading, processing, and storing the output signal of the second sensor component 5. For instance, an analogue-to-digital converter 11, a processing unit 12, a storage unit 13, a communication unit 14 and a power source 15 may be envisaged and arranged on the PCB 4. It should be mentioned that the PCB may also carry more or less electronic components. The PCB 4 may comprise a plurality of conductive tracks, pads and other features etched from one or more sheet layers of copper laminated onto a sheet layer of a non-conductive substrate 25. The electronic components 11, 12, 13, 14, 15 and the second sensor component 5 are generally soldered onto the PCB 4 to both electrically connect and mechanically fasten them to it.

The analogue-to-digital converter (ADC) 11 may convert the analogue output signal of the second sensor component 5 into a digital signal. For instance, the ADC may convert an input analogue voltage or current to a digital number representing the magnitude of the voltage or current. Typically, the digital output is a two's complement binary number that is proportional to the input, but there are other possibilities. The ADC 11 may feed the digital output to the processing unit 12.

The processing unit 12 may be any arrangement of electronic circuits, electronic components, processors, program components and/or the like configured to store and/or execute programming instructions, to direct the operation of the other functional components 5, 11, 13, 14 of the sensor arrangement 1, and may be implemented, for example, in the form of any combination of hardware, software, and/or firmware. The processing unit 12 may be configured to read, process and/or analyze the sensor signal of the second sensor component 5 and/or the digital signal provided by the ADC 11. In particular, the processing unit 12 may, based on the output signal of the second sensor component 5 and/or the ADC 11, determine the distance 19 and/or the magnitude of the mechanical loading applied to the second member 2.

The storage unit 13 may be used to store information sensed by the second sensor component 5 according to some implementations. The storage unit 13 may include volatile and/or non-volatile memory, and may store instructions that, when executed by the processing unit 12 or the second sensor component 5 cause methods and processes to be performed by the processing unit 12 or the second sensor component 5.

The communication unit 14 may include any combination of hardware, software, and/or firmware configured to facilitate establishing, maintaining, and using any number of communication links. In embodiments, the communication unit 14 of the sensor arrangement 1 facilitates wired or wireless communication with the processing unit 12. In embodiments, the communication component 14 may also facilitate communications with an external device (not shown) such as, for example, to facilitate coordinated operations between the sensor arrangement 1 and the external device. For example, a user may request the sensor output signal, sensor values or the like by the external device connected to the communication unit 14.

Further, a power source 15 may be envisaged to provide electrical power to the other operative components (e.g., analogue-to-digital converter 11, the second sensor component 5, the processing device 12, the storage unit 13, and the communication unit 14) of the sensor arrangement 1, and may be any type of power source suitable for providing the desired performance and/or longevity requirements of the sensor arrangement 1. In various embodiments, the power source 15 may include one or more batteries, which may be rechargeable (e.g., using an external energy source). The power source 15 may include one or more capacitors, energy conversion mechanisms, and/or the like. Power sources for sensor arrangements 1 are well known, and are therefore not discussed in greater detail herein.

The substrate 25 of the PCB 4 shown in FIGS. 1, 3 and 4 is made of a rigid material to ensure that a position of the second sensor component 5 remains constant independently of the orientation of the sensor arrangement 1.

FIG. 5 shows a slightly different embodiment of a PCB 4. The PCB 4 comprises a substrate 25 made of a flexible material. The PCB may include a slot 17 defining a tongue 16, and a frame 18 encompassing the tongue 16. The slot 17 and the corresponding tongue 176 may be substantially U-shaped or C-shaped. The tongue 16 is attached to the frame 18 in region of the first end portion 20 of the PCB 4. Thus, the tongue 16 is connected to the frame 18 at only one side thereof. The frame 18 is attached at least to the first side wall 7 and the second side wall 8. The frame may also be connected to the two further side walls. The second end portion of the PCB 4 is located on an end portion of the tongue 16. If a mechanical loading is applied to the casing 10, the frame 18 may be bended or stretched together with the first member 2 dependent on the magnitude and direction of the mechanical force. For instance, the frame 18 may extend parallel to the first member 2 in the loaded and the unloaded conditions of the sensor arrangement 1. However, the tongue 16 protrudes into the cavity 20 of the casing 10. When a force is applied to the first member 2, the tongue 16 can be flexed towards or away from the first member 2. For example, the second sensor component 5 may move towards the first sensor component 3 and the distance 19 decreases depending on the mechanical loading. The second sensor component 5 is arranged on the tongue 16 such that a position of the second sensor component 5 depends on the mechanical loading applied to the first member 2. Thus, a more sensitive sensor arrangement 1 can be provided by virtue of the embodiment shown in FIG. 5.

The present disclosure also provides a devices or a machine (not shown) for carrying variable loads such as a vehicle, a boom lift or a telehandler. The machine or device includes the sensor arrangement 1 in accordance with the above. For instance, said device or machine can comprise a load management information system (not shown), wherein the sensor arrangement 1 is part of said load management information system. The load management information system may provide an operator with an indication of how heavy the load is on the device/machine and/or where the load is in space. For instance, the sensor arrangement 1 can be mounted on a load carrying axle of the device/machine, such as a rear axle of the telehandler, wherein the sensor arrangement 1 measures deflections of the axle (e.g. the casting thereof) as load variations occur. These variations in load may provide the load management system with an indication of the longitudinal stability of the machine as it moves throughout the load chart. When load stability is near its limits, the sensor arrangement 1 can be configured to send signals to a control system, which will sound a cabin alarm and prevent functions that further reduce stability from operating.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

LIST OF REFERENCE NUMERALS 1 sensor arrangement
2 first member
3 first sensor component
4 printed circuit board
5 second sensor component
6 second member
7 first side wall
8 second side wall
10 casing
11 analogue-to-digital converter
12 processing unit
13 storage unit
14 communication unit
15 power source
16 tongue
17 slot
18 frame
19 distance
20 first end portion
21 second end portion
22 cavity
23 bore
24 structure
25 substrate
26 fastener
27 step
30 first end portion
31 second end portion
F mechanical loading

The invention claimed is:

1. A sensor arrangement for measuring a mechanical loading, comprising:
a first member to be mechanically loaded;
a first sensor component arranged on the first member;
a printed circuit board (PCB);
a second sensor component arranged on the PCB and spaced from the first sensor component, wherein an output signal of the second sensor component is indicative of a distance between the first and second sensor components; and
an electronic component arranged on the PCB and configured to receive the output signal of the second sensor component,
a second member, the PCB being arranged in a cavity between the first member and the second member;
wherein the sensor arrangement is configured such that the distance between the first and second sensor components depends on the mechanical loading applied to the first member.

2. The sensor arrangement according to claim 1, wherein the first sensor component includes a magnetic material and the second sensor component is configured to sense a magnetic field strength of the magnetic material.

3. The sensor arrangement according to claim 2, wherein the second sensor component comprises an inductive sensor, a Hall sensor or a magnetoresistive sensor.

4. The sensor arrangement according to claim 1, further comprising a first wall and an opposing second wall, wherein a first end portion of the PCB is attached to the first wall in a cantilever fashion, and the second sensor component is arranged on a second end portion of the PCB.

5. The sensor arrangement according to claim 1, wherein the first member and the PCB extend substantially parallel to each other in a non-loaded condition of the first member.

6. The sensor arrangement according to claim 1, configured such that the distance between the first sensor component and the second sensor component decreases or increases upon applying the mechanical loading to the first member.

7. The sensor arrangement according to claim 1, wherein the first member and the second member extend parallel to each other in a loaded condition and a non-loaded condition of the first member.

8. The sensor arrangement according to claim 7, further comprising a first wall and an opposing second wall, wherein a first end portion of the PCB is attached to the first wall in a cantilever fashion, and the second sensor component is arranged on a second end portion of the PCB, and further comprising a casing encompassing the PCB, wherein the first member, the second member, the first wall and the second wall are part of the casing.

9. The sensor arrangement according to claim 1, wherein the electronic component comprises at least one of an analogue-to-digital converter, a processing unit, a storage unit and a communication unit.

10. The sensor arrangement according to claim 1, further comprising fixing means for fixing the sensor arrangement to a structure in a cantilever fashion.

11. The sensor arrangement according to claim 1, wherein the PCB is positioned relatively to the first member such that a position of the second sensor component remains constant independently of the mechanical loading applied to the first member.

12. The sensor arrangement according to claim 1, wherein the PCB includes a slot defining a tongue, and a frame encompassing the tongue, wherein the frame is attached to a first wall and a second wall, and the second sensor component is arranged on the tongue such that a position of the second sensor component depends on the mechanical loading applied to the first member.

13. The sensor arrangement according to claim 12, wherein the slot and/or the tongue are substantially U-shaped or C-shaped.

14. A machine for carrying variable loads, the machine having the sensor arrangement in accordance with claim 1.

15. The machine of claim 14, wherein the sensor arrangement is configured such that the distance between the first sensor component and the second sensor component decreases or increases upon applying the mechanical loading to the first member.

16. The machine of claim 14, wherein the first member and the second member extend parallel to each other in a loaded condition and a non-loaded condition of the first member, and wherein the sensor arrangement further comprises a first wall and an opposing second wall, wherein a first end portion of the PCB is attached to the first wall in a cantilever fashion, and the second sensor component is arranged on a second end portion of the PCB, and the sensor arrangement further comprises a casing encompassing the PCB, wherein the first member, the second member, the first wall and the second wall are part of the casing.

17. The machine of claim 14, wherein the electronic component comprises at least one of an analogue-to-digital converter, a processing unit, a storage unit and a communication unit.

18. The machine of claim 14, wherein the PCB is positioned relatively to the first member such that a position of the second sensor component remains constant independently of the mechanical loading applied to the first member.

19. The machine of claim 14, wherein the PCB includes a slot defining a tongue, and a frame encompassing the tongue, wherein the frame is attached to the first wall and the second wall, and the second sensor component is arranged on the tongue such that a position of the second sensor component depends on the mechanical loading applied to the first member.

* * * * *